March 24, 1959      B. L. BRUCKEN      2,878,662
WOBBLE MECHANISM FOR FLUFFING CLOTHES IN A DOMESTIC APPLIANCE
Filed Sept. 2, 1955      12 Sheets-Sheet 1

INVENTOR.
Byron L. Brucken
BY
His Attorney

Fig. 6 WASH

INVENTOR.
Byron L. Brucken

Fig. 7

SPIN

INVENTOR.
Byron L. Brucken

Fig. 8

March 24, 1959     B. L. BRUCKEN     2,878,662
WOBBLE MECHANISM FOR FLUFFING CLOTHES IN A DOMESTIC APPLIANCE
Filed Sept. 2, 1955     12 Sheets-Sheet 5

INVENTOR.
Byron L. Brucken
BY
His Attorney

March 24, 1959     B. L. BRUCKEN     2,878,662
WOBBLE MECHANISM FOR FLUFFING CLOTHES IN A DOMESTIC APPLIANCE
Filed Sept. 2, 1955     12 Sheets-Sheet 6

INVENTOR.
Byron L. Brucken
BY R. R. Candor
His Attorney

March 24, 1959   B. L. BRUCKEN   2,878,662
WOBBLE MECHANISM FOR FLUFFING CLOTHES IN A DOMESTIC APPLIANCE
Filed Sept. 2, 1955   12 Sheets-Sheet 7

Fig. 16

INVENTOR.
Byron L. Brucken
BY
R R Candor
His Attorney

March 24, 1959 B. L. BRUCKEN 2,878,662
WOBBLE MECHANISM FOR FLUFFING CLOTHES IN A DOMESTIC APPLIANCE
Filed Sept. 2, 1955 12 Sheets-Sheet 8

INVENTOR.
Byron L. Brucken
BY R R Candor
His Attorney

March 24, 1959 B. L. BRUCKEN 2,878,662
WOBBLE MECHANISM FOR FLUFFING CLOTHES IN A DOMESTIC APPLIANCE
Filed Sept. 2, 1955 12 Sheets-Sheet 10

INVENTOR.
Byron L. Brucken
BY
His Attorney

March 24, 1959     B. L. BRUCKEN     2,878,662
WOBBLE MECHANISM FOR FLUFFING CLOTHES IN A DOMESTIC APPLIANCE
Filed Sept. 2, 1955     12 Sheets-Sheet 11

WASH

Fig. 29

DRY

Fig. 31

WASH

Fig. 28

DRY

Fig. 30

INVENTOR.
Byron L. Brucken
BY R. R. Candor
His Attorney

March 24, 1959   B. L. BRUCKEN   2,878,662
WOBBLE MECHANISM FOR FLUFFING CLOTHES IN A DOMESTIC APPLIANCE
Filed Sept. 2, 1955   12 Sheets—Sheet 12

Fig. 32

INVENTOR.
Byron L. Brucken
BY R K Candor
His Attorney

United States Patent Office 2,878,662
Patented Mar. 24, 1959

2,878,662

WOBBLE MECHANISM FOR FLUFFING CLOTHES IN A DOMESTIC APPLIANCE

Byron L. Brucken, Dayton, Ohio, assignor to General Motors Corporation, Detroit, Mich., a corporation of Delaware Application September 2, 1955, Serial No. 532,235

16 Claims. (Cl. 68—19)

This invention relates to a domestic appliance and more particularly to a combined washer-dryer having an upright tub.

Washing machines with upright tubs have been widely produced and used. However, to arrange such a machine to dry the clothes has been a difficult problem since all the dryers now being produced and used for domestic use are of the horizontal drum type in which the clothes are untangled and fluffed within the rotating horizontal drum.

It is an object of this invention to provide a simple effective practical method and apparatus for drying and fluffing clothes in the upright tub of a washing machine.

It is another object of this invention to provide in a top opening combined washer-dryer with an upright tub an arrangement for effectively fluffing and drying the clothes in an improved manner following centrifuging.

It is another object of this invention to provide a top opening combined washer-dryer with an upright tub and an independent agitator for washing and with an improved mechanism for fluffing and drying the clothes in the same upright tub following centrifuging of the clothes.

These and other objects are attained in the form of combined washer-dryer disclosed in this application in which an independent agitator is moved eccentrically in the tub for washing. The tub is rotated upon its own axis for centrifuging the washing liquid from the clothes. For fluffing and drying the clothes following centrifuging, the lower end of the agitator shaft is moved eccentrically at a predetermined rate to wobble the tub in the presence of heated circulating air while the tub is being rotated in the opposite direction at a much slower rate. All of the steps in the washing and drying cycles are automatically controlled.

Further objects and advantages of the present invention will be apparent from the following description, reference being had to the accompanying drawings, wherein a preferred form of the present invention is clearly shown.

Figures 1, 2, 3, 4, 5:
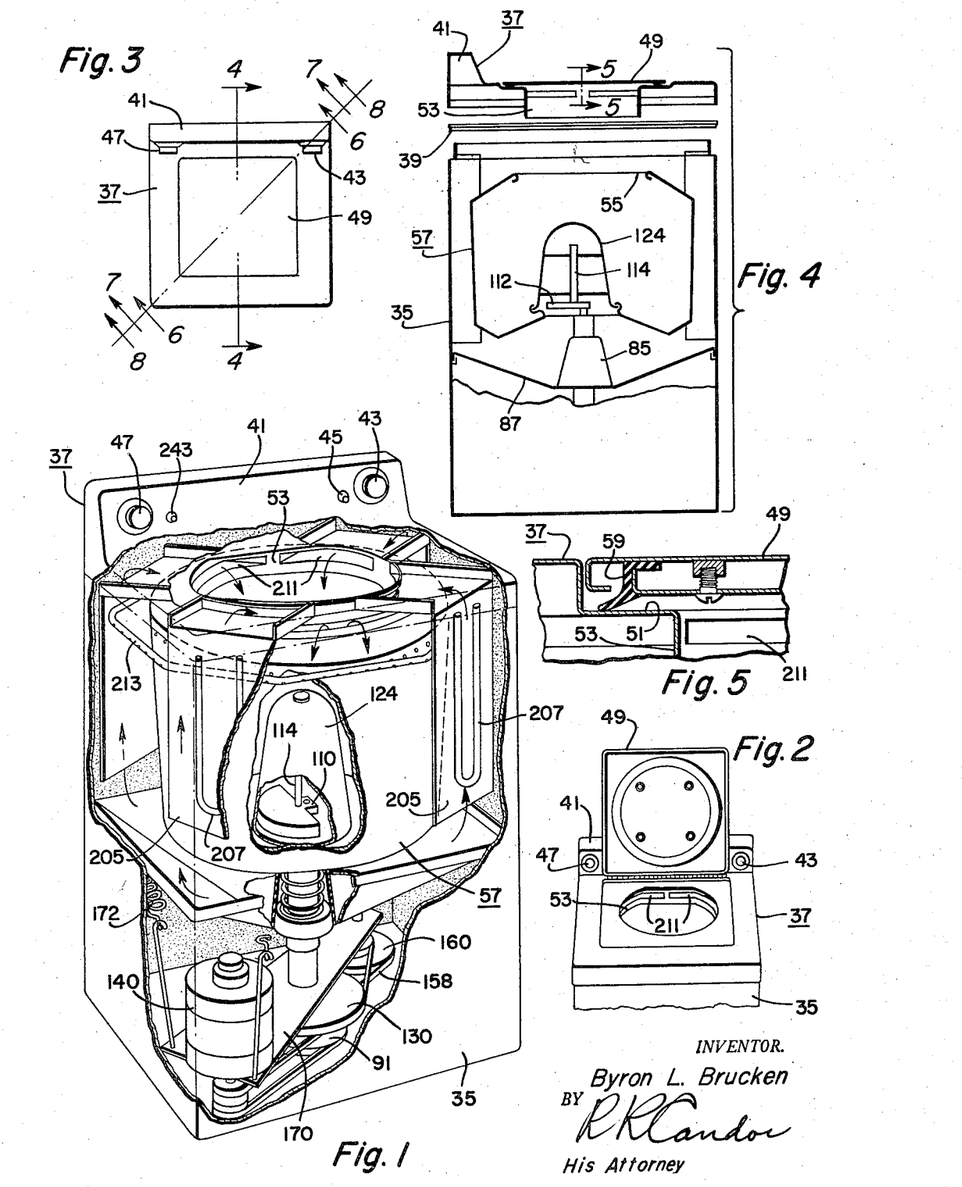
Figure 1 is a perspective view of a combined washer-dryer embodying one form of my invention with portions of the walls broken away to reveal the interior parts.
Figure 2 is a perspective view of the upper portion of the cabinet with the lid open.
Figure 3 is a small top view of the combined washer-dryer with the lid closed.
Figure 4 is a vertical sectional view partly diagrammatic and partly exploded taken substantially along the line 4—4 of Figure 3 illustrating the interfitting construction and seal between the top and bottom portions of the cabinet.
Figure 5 is a fragmentary vertical sectional view taken along the line 5—5 of Figure 4.

Referring now to the drawings and more particularly to Figures 1 to 5 there is shown a combined washer-dryer including an upright rectangular cabinet 35 provided with a top 37 which is removable for access to the interior. A seal 39 extends around the walls of the cabinet sealing the top to the bottom thereof. The top 37 is provided with a back splash panel portion 41 provided with a timer dial knob 43, a water temperature selector switch 45 and a dryer temperature selector control 47. The top 37 is provided with a recessed lid 49 which is substantially square. The top is provided with a square recess 51 receiving the lid. The central portion of this recess 51 is provided with a downwardly flanged cylindrical portion 53 surrounding a central opening for access to the top opening 55 of the round tub 57. The lid is provided with a gasket seal 59 held against the upper panel of the lid by the inner panel thereof as shown in Figure 5. This gasket seal 59 makes sealing engagement with the recess 51 when the lid 49 is closed. The lid 49 is hinged at the rear upon a piano-type hinge as shown in Figure 2.

Figure 8:
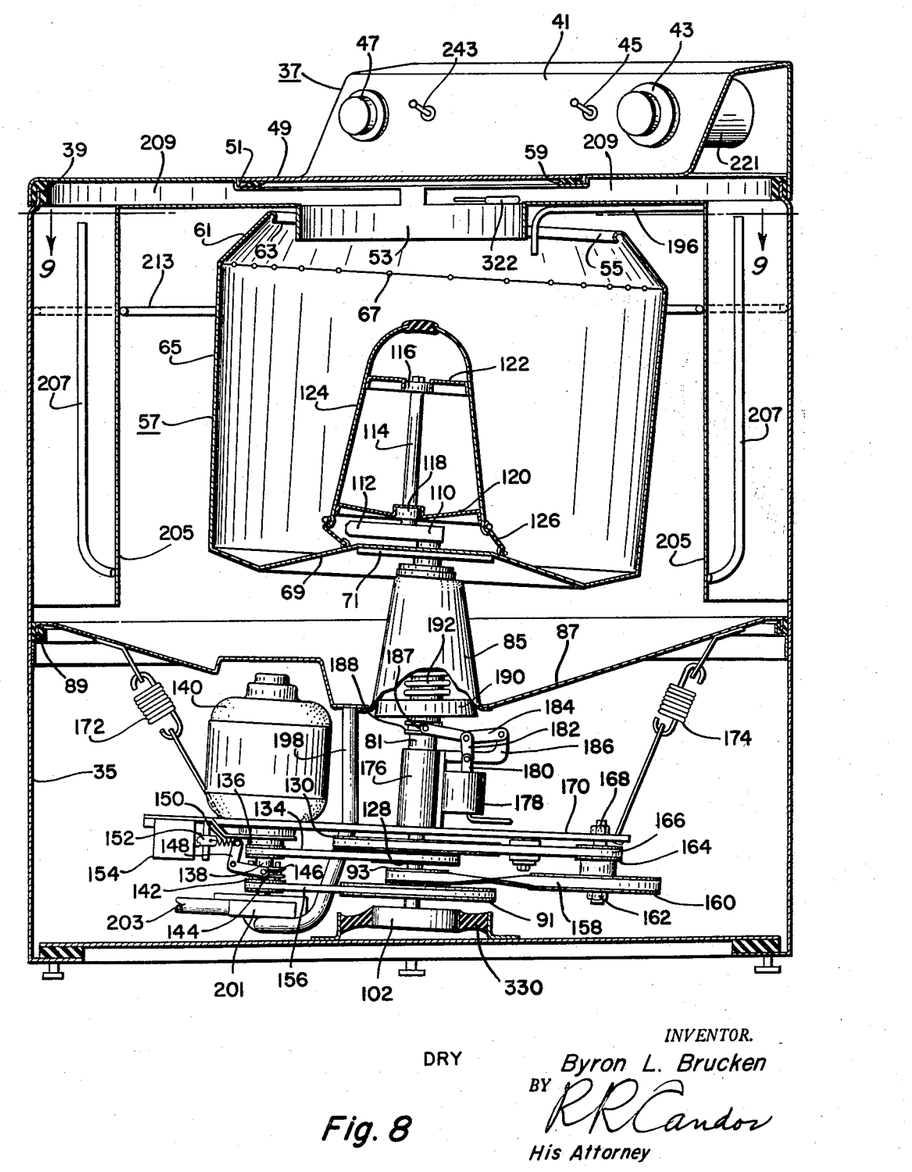
Figure 8 is a sectional view taken along the line 6—6 of Figure 3 showing the drying operation.

As better shown in Figure 8, the tub 57 is provided with an inwardly and upwardly extending top wall 61 provided with an opening and a curled edge 63 surrounding the downwardly flanged cylindrical portion 53 around the opening in the top wall 37. The tub 57 is provided with an upwardly and outwardly flared side wall 65. At the junction of the top and side walls 61 and 65 there is provided a series of perforations 67 permitting the free escape of liquid when the tub 57 is spun for centrifuging. The side wall 65 connects directly to the bottom wall 69 which in turn connects to a central plate 71 better shown in Figure 13. This round plate 71 has an inner hub threaded onto the upper end of a coaxial sleeve 73. This plate 71 holds a spacer ring 75 in contact with the inner race of a ballbearing 77 which is thereby held in contact with the upper end of the sleeve 73.

Figure 6:
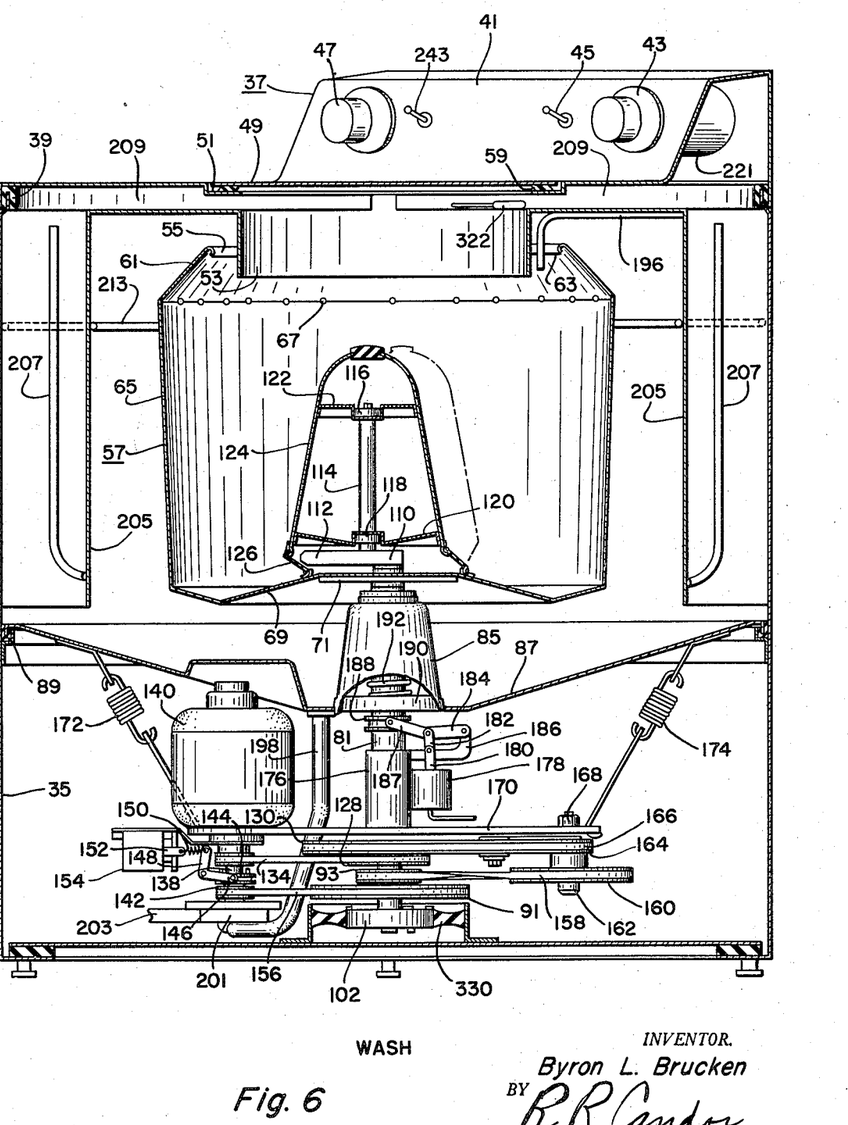
Figure 6 is an enlarged sectional view taken along the line 6—6 of Figure 3 showing the agitating operation.

The outer race is supported in a recess in a bearing support 79 provided upon the top of the tubular housing 81. This bearing support 79 is clamped by the threaded ring 83 to the top of a conical shaped resilient supporting member 85 of suitably reinforced synthetic rubber. This support 85 provides controlled lateral and vertical resilience with an amount of damping effect. This support 85 is in turn supported upon the center of the bulkhead or catch basin 87 as shown in Figure 6. This bulkhead or catch basin 87 has its edges resting in the seal 89 supported upon the inner surface of the vertical walls of the cabinet 35.

The lower end of the concentric sleeve or tub shaft 73 is supported upon a thrust ballbearing 90 which in turn rests upon the hub of a large pulley 91. A small pulley 93 surrounds the hub of the large pulley 91 and is fixed to it. The hub of the pulley 91 is keyed to a central vertical agitator shaft 95. The lower end of the shaft 95 is pinned to a small eccentric 97 rotatably mounted within a large eccentric 99 which in turn is rotatably mounted in a cylindrical bearing 102 provided with flanges holding the outer eccentric in place. The two eccentrics have the same or equal throw. Suitable bearing surfaces are provided between the parts 97, 99 and 102.

Figure 20:
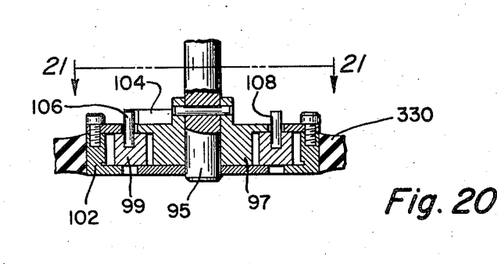
Figure 20 is a fragmentary vertical sectional view taken substantially along the line 20—20 of Figure 21 showing the double eccentric centered for washing and spinning.

The purpose of this double eccentric construction is to make it possible to rotate the bottom of the center agitator shaft 95 either concentrically or eccentrically for a purpose hereinafter to be disclosed. To do this automatically, the inner eccentric 97 is provided with a laterally extending arm 104 extending over the face of the outer eccentric 99. The outer eccentric 99 has two upwardly projecting pins 106 and 108 extending upwardly in the path of relative rotation of the projecting arm 104 as shown in Figure 20. If the central agitator shaft 95 and the inner eccentric are turned in the counter-clockwise direction as viewed in Figure 21, the projection 104 will engage the stop pin 106 positioning the eccentrics 97 and 99 in a counteracting or neutralizing relationship so that the shaft 95 and the two eccentrics 97 and 99 rotate concentrically within the ring bearing 102. However, if the central shaft 95 and the inner eccentric 97 are turned in the clockwise direction as viewed in Figure 22, the arm 104 engages the stop pin 108 to change the relative position of the eccentrics 97 and 99 by 180° so that their eccentricity is additive or compounded. This causes the central agitator shaft 95 to move eccentrically about the center of the ring bearing 102. This direction of rotation is used to provide a wobbling of the tub 57 for fluffing the clothes during drying as will hereinafter be described.

The central shaft 95 extends upwardly within the sleeve 73 and at its upper end is threaded to receive a crank arm 110 which extends to form a counterbalance 112. Threaded into the crank arm 110 is an agitator post 114 extending upwardly into the agitator 124 provided with lower and upper ballbearings 116 and 118. These ballbearings fit the lower and upper horizontal walls 120 and 122 within this cone-shaped agitator 124. The skirt of this agitator 124 is connected and sealed to a band type flexible seal 126 which is also sealed to the inner portion of the bottom 69 of the tub 57. When the shaft 95 is rotated, the agitator 124 is revolved eccentrically about the axis of the shaft 95.

Figure 16:
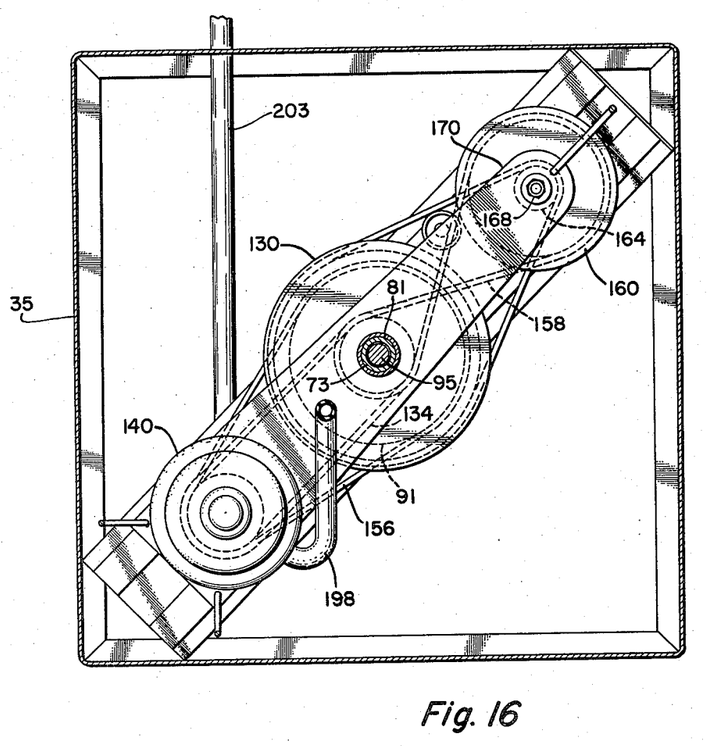
Figure 16 is a horizontal sectional view taken along the line 16—16 of Figure 13.
Figure 23:
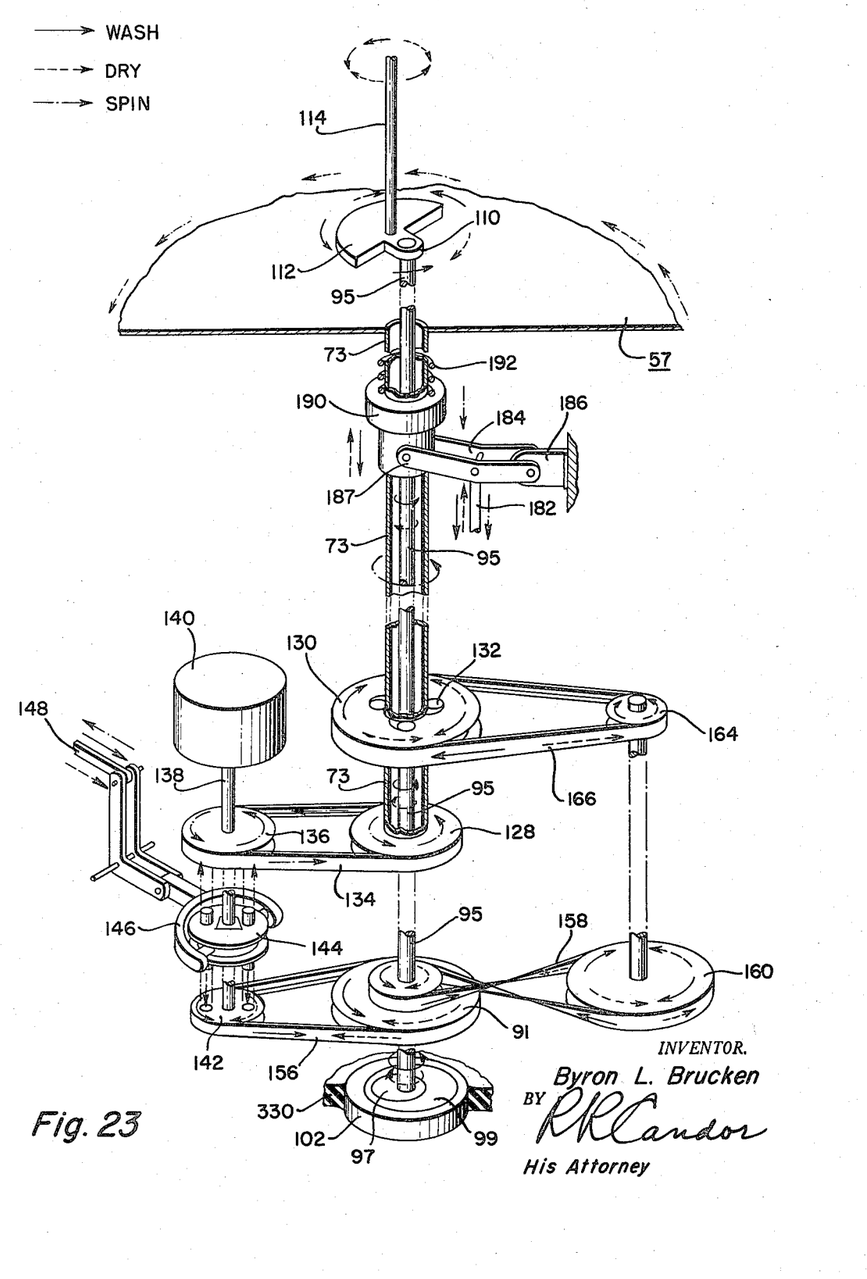
Figure 23 is a fragmentary diagrammatic view of the major driving parts.

Fixed to the bottom of the sleeve 73 is a small pulley 128. Above this pulley 128 is a large pulley 130 connected to the pulley 128 and the sleeve 73 by a one-way clutch 132. As better shown in Figures 16 and 23 the pulley 128 is connected by the V-belt 134 to a drive pulley 136 rotatably mounted upon the drive shaft 138 of a drive motor 140. Also rotatably mounted upon the motor shaft 138 is a small drive pulley 142. Between these drive pulleys 136 and 142 and splined to the motor shaft 138 is a vertically movable clutch member 144 provided with clutching pins extending in opposite directions which are adapted to engage recesses in either of the pulleys 136 and 142. The clutch member 144 is provided with an annular groove engaged by a shifting fork 146 extending from a bell crank lever 148. The other end of the bell crank lever 148 is connected by a stiff spring 150 to the operating plunger 152 of a solenoid 154.

The pulley 142 is connected by a V-belt 156 to the large pulley 91 to which is fixed the small pulley 93. The small pulley 93 is connected by a cross-belt 158 to a larger pulley 160 rotatably mounted upon the lower end of the shaft 162 fastened by the nut 168 at its upper end to the support 170. The pulley 160 is keyed to a smaller pulley 164 which is connected by a V-belt 166 to the large pulley 130. The horizontal support 170 is supported by two diagonally positioned coil springs and connectors 172 at the motor end and a single spring support and connector 174 at the opposite end. These springs 172 and 174 are connected to connectors which in turn are bonded to the bottom of the bulkhead 87. The support 170 is fastened to the bottom of the sleeve 81.

Figures 10, 11:
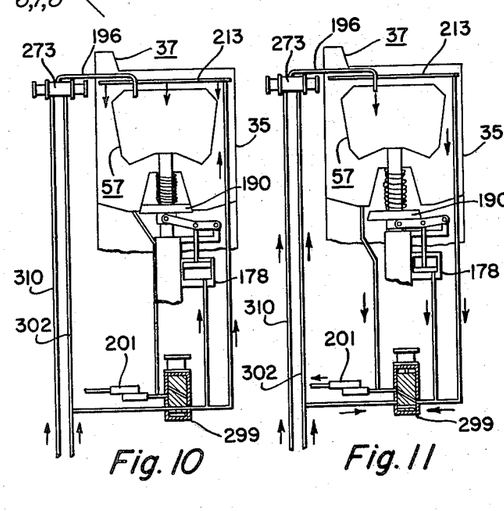
Figure 10 is a diagrammatic view illustrating the limiting of the lateral movement of the tub during the drying period.
Figure 11 is a view similar to Figure 10 but showing the mechanism released to permit the tub to move laterally during the washing and centrifuging periods.
Figure 12:
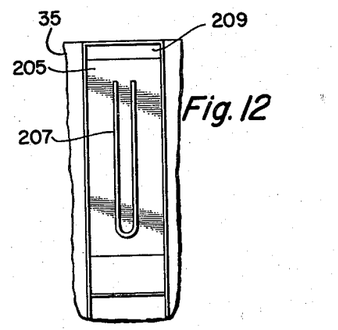
Figure 12 is a fragmentary vertical sectional view taken along the line 12—12 of Figure 9 showing one of the hot air ducts with its electric heaters.
Figures 17, 18, 19, 21, 22:
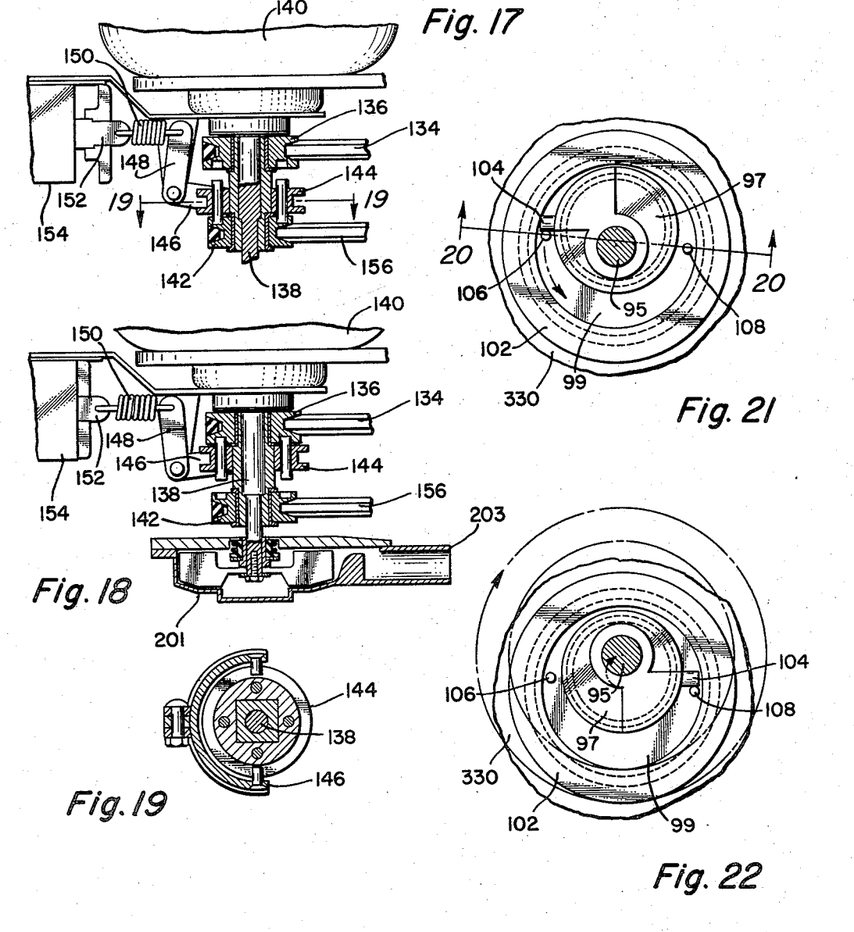
Figure 17 is a fragmentary sectional view of the drive motor and its clutches shown in the washing and drying position.
Figure 18 is a fragmentary sectional view showing motor clutches and the washing machine pump in the spin position.
Figure 19 is a fragmentary sectional horizontal view taken along the line 19—19 of Figure 17.
Figure 21 is a fragmentary horizontal sectional view taken substantially along the line 21—21 of Figure 20 with the eccentrics oppositely nested to make the inner shaft concentric for washing and spinning.
Figure 22 is a fragmentary sectional view similar to Figure 21 showing the eccentrics compounded to provide maximum eccentricity for wobbling the tub during the drying period.

Surrounding the sleeve 81 is a support 176 which supports a hydraulic cylinder 178 containing a piston and a piston rod 180 which is connected by the link 182 to a lever 184 pivoted upon the bracket 186 connected to the support 176. The end of this lever 184 is provided with a fork connection 187 to the angular groove in the shifting collar 188. This shifting collar 188 is connected directly to the plug 190 which is slidably mounted upon the sleeve 81. This plug 190 fits the inner periphery of the bottom of the synthetic rubber support 85 to limit the amount of movement between the sleeve 81 and the bulkhead 87 and particularly to form a universal pivot for the wobbling of the tub during drying. This plug is made of resilient material such as synthetic rubber and may be provided with a metal band around its periphery. This plug 190 is normally urged to its normal lower position as illustrated in Figure 11 by a compression type coil spring 192 which surrounds the sleeve 81 and extends between the plug 190 and the spring retainer 194. During the drying period, however, the plug 190 is moved up to the position shown in Figure 10 by the hydraulic cylinder. This makes the tub and mechanism assembly suspended upon the support 85 to pivot substantially about the center of the plug 190 so that the tub 57 may be wobbled about this point by the compounded eccentrics as shown in Figure 22.

The tub 57 is filled through the fill tube 196. The liquid is spun out of the clothes and the tub during the spinning period through the perforations 67 into the bulkhead 87. The bulkhead 87 is drained through the tube 198 to the drain pump 201 which is connected to the bottom of the shaft 138 of the motor 140 as shown in Figure 18. This pump 201 operates whenever the motor 140 is operating. It will pump in the same direction regardless of the direction of rotation of the motor 140. The pump 201 pumps the liquid through the drain connection 203 to a suitable drain.

Figure 30:
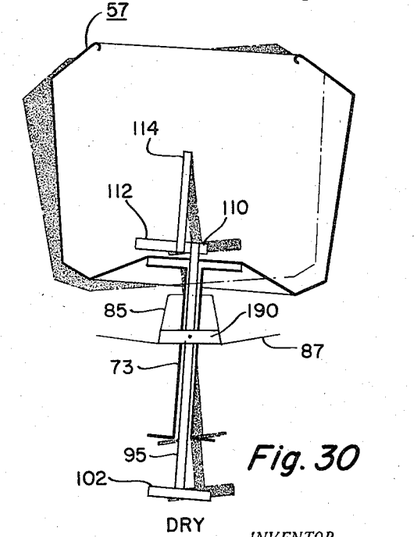
Figure 30 is a diagrammatic vertical sectional view similar to Figures 26 and 28 showing the major parts in position for the drying period.
Figure 31:
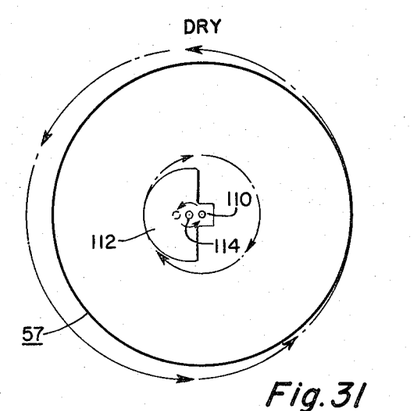
Figure 31 is a diagrammatic top view showing the major upper parts as they operate during the drying periods.

To provide a method of drying, across each of the corners of the cabinet 35 above the bulkhead 87 are vertical partition walls 205 providing vertical ducts. Within each of these ducts fastened to the partition walls 205 is an electric heater 207. The tops of these vertical ducts connect to four radially inwardly extending ducts 209 connecting directly with openings 211 in the downwardly extending flange 53 surrounding the opening beneath the lid 49. During the drying period, the tub 57 is wobbled as shown in Figures 30 and 31 by the rotation of the compounded eccentric and the counterbalance 112. The wobbling of the tub within the chamber above the bulkhead 87 causes a forced circulation of air outwardly beneath the bottoms of the partition walls 205 up the corner ducts and thence inwardly through the radial ducts 209. In this forced circulation the air is discharged from the openings 211 into the interior of the tub 57 where the air picks up moisture and escapes from the tub through the opening 55 around the flange 53. The heaters 207 heat the air as the air flows upwardly through the vertical ducts increasing the capacity of the air to absorb and hold moisture. The moisture is condensed from this air by water from the condenser tube 213 which extends around the inner surface of the side walls of the cabinet 35 and the inwardly facing surfaces of the partition walls 205 as shown in Figures 1 and 6 to 8. Water is discharged through perforations in the tube 213 onto these adjacent vertical surfaces and flows downwardly in a thin film into the bulkhead 87 from which it is drained by the tube 198. The thin film of water from the tube 213 on these vertical surfaces condenses moisture from the heated moist circulating air. This condensed moisture together with any lint is carried with the condensing water to the bulkhead 87 and to the drain. The pump 201 assures that all will be pumped to the drain.

Figure 32:
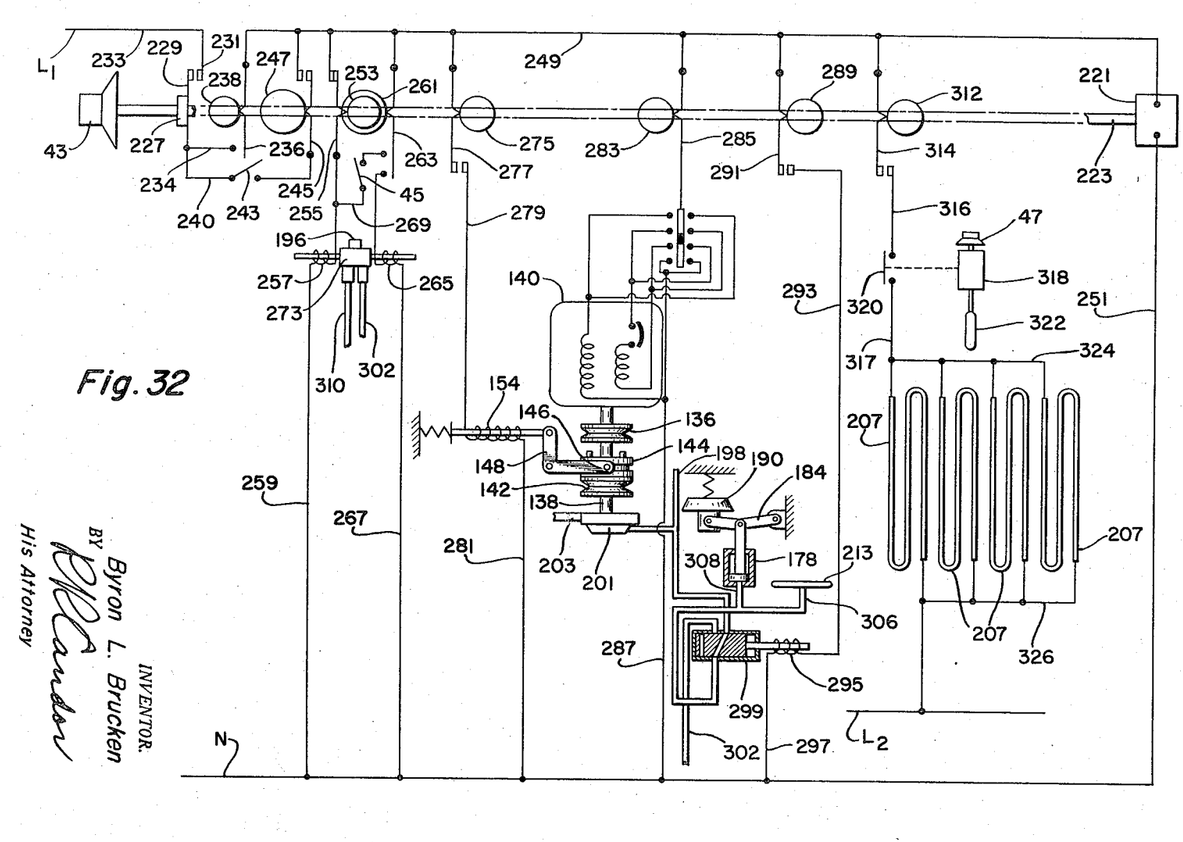
Figure 32 is a controlled wiring diagram.

The machine is preferably controlled automatically by the control system shown in Figure 32. This system includes a timer motor 221 which drives a cam shaft 223. This cam shaft has an axially slidable front portion carrying a collar 227 connecting with an axially movable start and stop switch member 229 for making and breaking contact with the contact 231 connected by the conductor 233 to the supply conductor $L_1$. This front portion of the shaft is moved axially and also rotated manually when desired by the knob 43. The switch member 229 is connected by the conductor 234 to a switch 236 operated by a cam 238 which opens the switch 236 at the end of the washing and rinsing period to stop the entire machine in the event that drying is not desired. The switch 229 also is connected by the conductor 240 to a manual switch 243 connecting to the switch member 245 operated by the cam 247 on the cam shaft 223. This cam 247 is designed to open the switch 245 to stop the machine at the end of the drying period. The switches 243 and 245 close a shunt circuit around the switch 236 to prevent the stopping of the machine at the end of the final rinse. The switches 236 and 245 are connected by the conductor 249 to one terminal of the timer motor 221. The second terminal of the timer motor 221 is connected by the conductor 251 to the neutral supply conductor N.

The cam shaft 223 is provided with a cam 253 for closing the switch 255 connecting the conductor 249 with the hot water solenoid coil 257 and the conductor 259 connecting to the neutral supply conductor N. A second cam 261 controls a switch 263 having two contacts. One of the contacts connects with the cold water solenoid 265 and is connected by the conductor 267 to the neutral supply conductor N. The second contact of switch 263 connects to a shunt 269 provided with a manually operable water supply selector switch 45 which connects to the hot water solenoid 257 and which may be closed to obtain rinse fills of mixed hot and cold water. If the switch 45 is open, the rinse fills will be of cold or tepid water from the cold or tepid water supply 302. The solenoid 265 controls the cold water valve in the valve body 273 while the solenoid 257 controls the hot water valve which controls hot water flow from the hot water supply 310. Both valves discharge from the valve body 273 into the fill tube 196.

The cam shaft 223 is also provided with a cam 275 operating a switch 277 connected by the conductor 279 to the solenoid 154 of the clutch shifting mechanism. This solenoid 154 is connected by the conductor 281 to the neutral supply conductor N.

The cam shaft 223 is also provided with a cam 283 which operates the reversing switch 285 to operate the motor 140 in either direction of rotation. The switch 285 alternately connects opposite terminals of the motor 140 through the conductor 287 to the neutral supply conductor N.

The cam shaft 223 is provided with a cam 289 operating the switch 291 connecting the conductor 249 to the conductor 293 which connects to a solenoid 295. This solenoid 295 is also connected by the conductor 297 to the neutral supply conductor N. The solenoid 295 controls a water valve 299 which normally shuts off the supply connection 302 and also normally connects the hydraulic cylinder 178 through the conduit 304 to the drain conduit 203. However, when the solenoid 295 is energized by the closing of the switch 291, the water flows from the supply connection 302 to the valve 299 and the conduit 306 to the condenser spray tube 213. Also, the water flows from the valve 299 through the conduit 308 to the hydraulic cylinder 178 moves its piston and the lever 184 and the plug 190 into the position shown in Figure 10.

Figure 7:
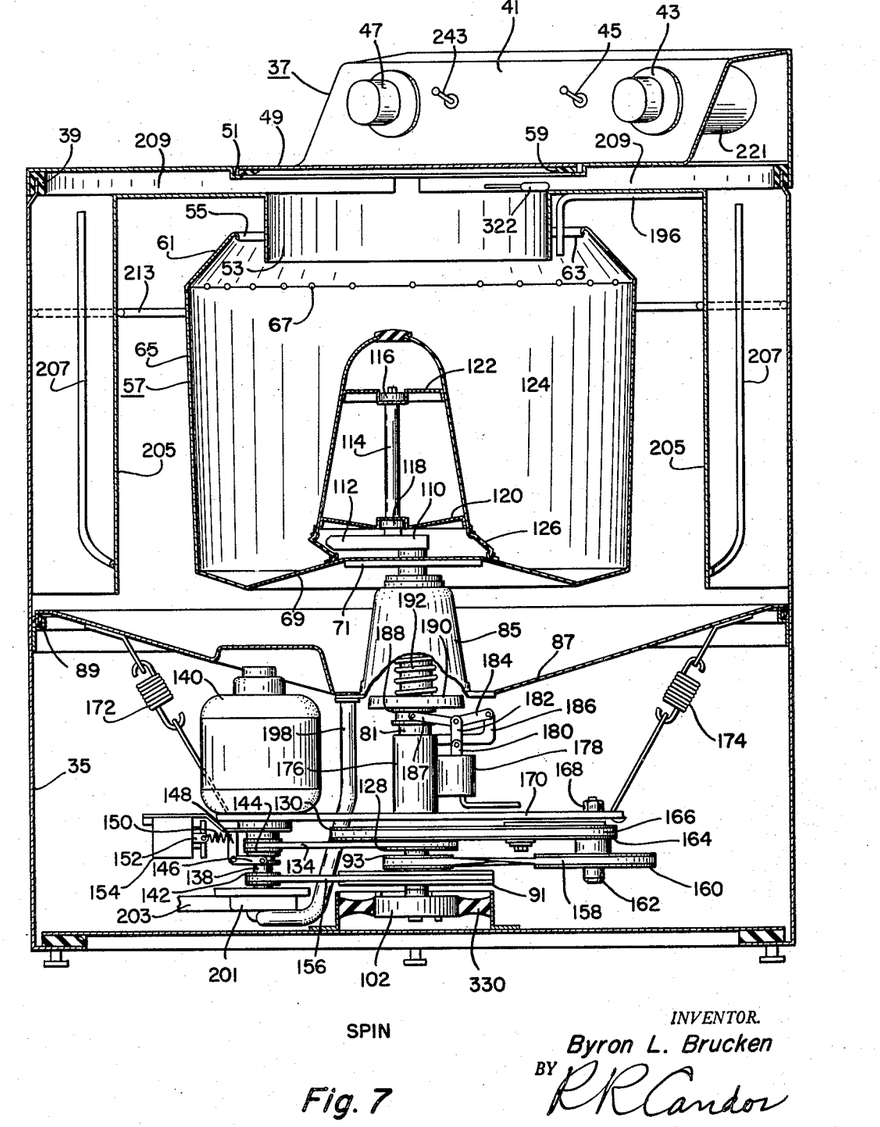
Figure 7 is an enlarged sectional view taken along the line 6—6 of Figure 3 showing the centrifuging operation.
Figure 9:
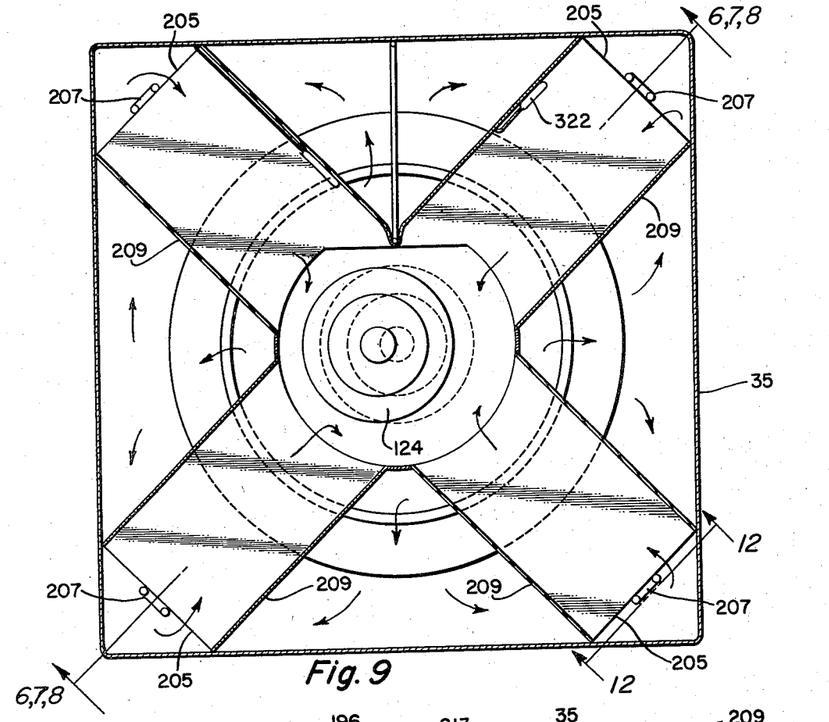
Figure 9 is a horizontal sectional view taken along the line 9—9 of Figure 8.

The cam shaft 223 is provided with a cam 312 which operates a switch 314 connecting through the conductor 316 with the dryer temperature selector 318 having the thermostatically controlled contacts 320. The selector 318 also has a thermostat bulb 322 located on one of the upper ducts 209 as shown in Figures 7 to 9. The switch 320 connects through the conductor 317 with the common conductor 324 connecting with one terminal of each of the heaters 207. The opposite terminals of the heaters 207 are connected through the conductor 326 to the supply conductor $L_2$. When the switches 314 and 320 are closed, the heaters 207 have a voltage of about 236 volts applied to them to cause them to heat the atmosphere within the four vertical corner ducts. The dryer temperature selector 318 is adjustable by the selector knob 47 to select the temperature to be maintained during the drying period.

In operation, if it is desired only to provide a wash period the switch 243 is opened. If it is desired to dry the clothes following the washing and rinsing periods, the switch 243 is closed. The closing of the switch 243 shunts or bypasses the switch 236 which is operated to open position by the cam 238 at the end of the final centrifuging period of the washing cycle. To start operation at the beginning of the washing period, the knob 43 is turned to the starting position for the wash period. If only drying is desired, the knob 43 is turned directly to the starting position for the drying period. The cam 238 is arranged so that it recloses the switch 236 after the open period at the end of the final centrifuging period. The knob 43 is also pushed in to close the switch members 229 and 231. This energizes the timer motor 221 which operates the cams 253 and 261 to close the switches 255 and 263 to energize the solenoids 257 and 265 to cause hot water and cold water to flow from the supply pipes 310 and 302 through the water valve 273 and the fill tube 196 into the tub for a time sufficient to fill the tub 57 to a level sufficient for washing.

Figures 28, 29:
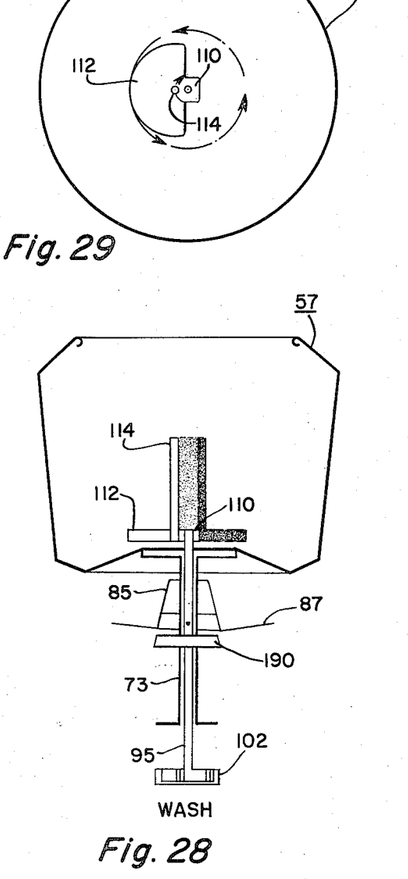
Figure 28 is a diagrammatic vertical view similar to Figure 26 showing the major parts in position for washing.
Figure 29 is a diagrammatic top view showing the major upper parts in position for drying.

The timer motor 221 then moves the cam 283 in position to move the reversing switch 285 to the forward position to operate the motor 140 to drive through the shaft 138, the clutch member 144 and the pulley 142 in the forward direction indicated by the arrows in full line. The pulley 142 drives the belt 156 to rotate the inner shaft 95 to move the agitator 124 eccentrically as illustrated in Figures 28 and 29. This agitates the liquid and the clothes in the tub. In this direction of rotation, the eccentrics 97 and 99 move and rotate concentrically as shown in Figure 21. These eccentrics rotate within the ring 102 which is supported by a rubber mounting 330 as shown in Figure 20.

At the end of the washing period, the cam 275 moves the switch 277 to closed position to energize the solenoid 154 to connect the clutch 144 to the pulley 136. At the same time the cam 283 holds the reversing switch 285 in the forward position thereby causing the motor 140 to continue to turn in the same direction to drive through the pulley 136, the belt 134 and the pulley 128 to rotate the tub shaft 73 to spin the tub 57 at a relatively high speed such as 1100 r.p.m. The liquid in the tub and in the clothes is centrifuged out through the perforations 67 in the upper portion of the tub 57 into the bulkhead 87 which is drained by the drain tube 198. The pump 201 pumps this liquid to the drain through the tube 203.

Figures 13, 14, 15:
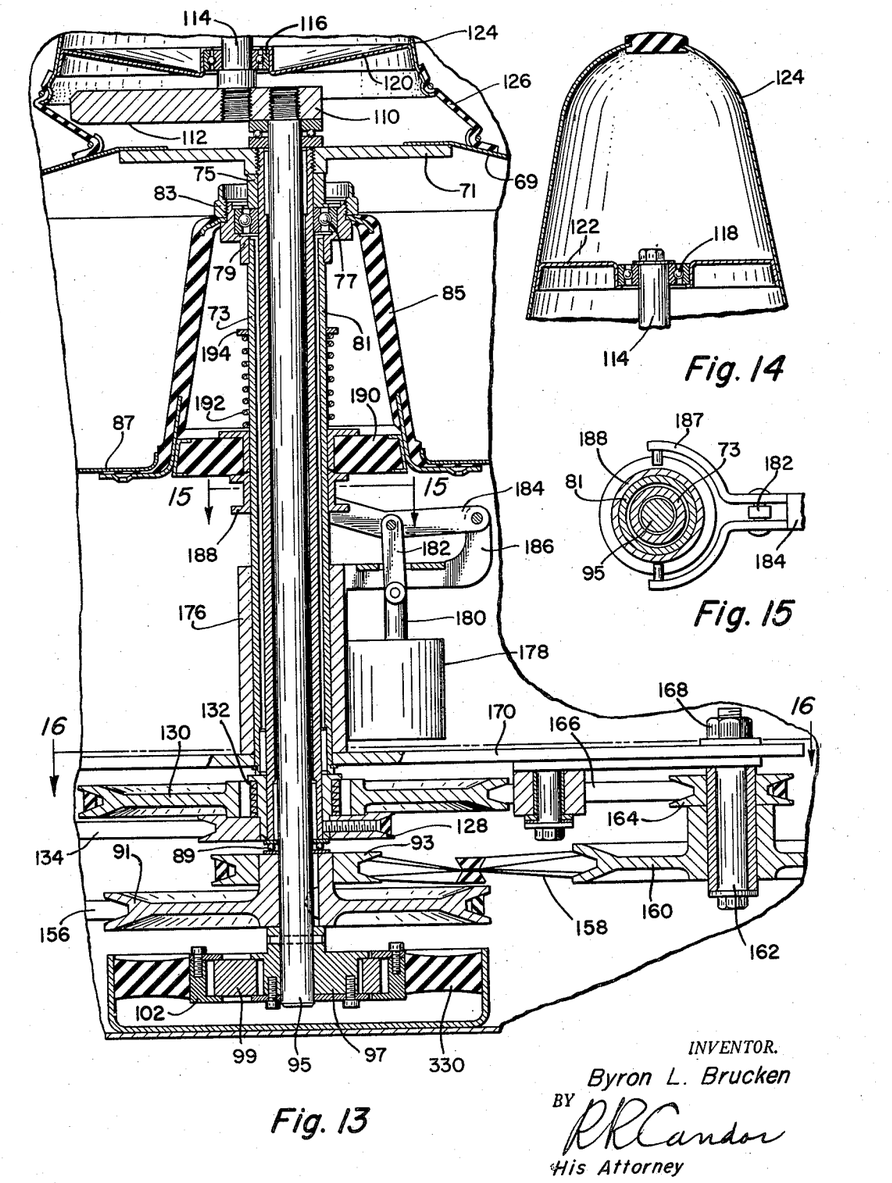
Figure 13 is an enlarged sectional view of a portion of the washing agitating and drying mechanism as arranged for the drying operation.
Figure 14 shows a continuation of the agitator of which only the bottom is shown in Figure 13.
Figure 15 is a fragmentary sectional view taken along the line 15—15 of Figure 13.

During both of these periods, the one-way clutch 132 overruns so that the pulley 130 is disconnected from the tub shaft 73. A second rinse period similar to the washing or agitating period follows together with a second centrifuging period. If the switch 243 is open, the cam 238 will stop the operation at the end of the final centrifuging period by opening the switch 236. However, if the switch 243 is closed, the timer motor 221 will continue to operate. The cam 289 will then close the switch 291 to energize the solenoid 295 to move the valve 299 to a position connecting the cold water supply conduit 302 with the hydraulic cylinder 178 and also to the condenser spray tube 213. This connects the water system for the drying period as illustrated in Figure 10. The hydraulic cylinder moves the plug 90 into position within the support 85 as shown in Figures 10 and 13. The water which flows through the conduit 306 to the condenser spray tube 213 is sprayed onto the inner walls of the cabinet to condense moisture out of the atmosphere which is circulated by the wobbling of the tub 57 in the chamber above the bulkhead 87. The cam 283 also moves the reversing switch 285 to the reversing position. The cam 275 moves the switch 277 to the open position to deenergize the solenoid 154 to cause the clutch member 144 to reengage the pulley 142. This causes the pulley 142 to operate in the reverse direction as indicated by the dotted arrows in Figure 23. The belt 156 drives the pulley 91 and the center shaft 95 at a moderate speed (for example 350 r.p.m.) in the reverse direction of rotation. This moves the eccentrics 97 and 99 to the additive or compounded position illustrated in Figure 22. This causes the eccentric rotation of the bottom of the shaft 95 to cause the tub to wobble about the point of the plug 190 as illustrated in Figure 30. This is assisted by the counterbalance 112 located on the opposite side of the shaft 95 and which is rotated eccentrically at the same speed in the same direction within the agitator to assist in the wobbling of the tub 57.

At the same time, the smaller pulley 93 through the crossed belt 168 and the pulleys 160 and 164 as well as the belt 166 rotates the pulley 130 in the opposite direction at a relatively slow speed such as 50 r.p.m. The rotation of the pulley 130 in this direction causes the one-way clutch 132 to engage and connect the pulley 130 to the tub shaft 73 to rotate the tub 73 in the opposite direction at a speed of about 50 r.p.m. This is called "turnback." This wobbling of the tub 57 in one direction at a suitable rate of speed and the reverse rotation of the tub at a suitable slow speed or turnback provides an excellent distributing and fluffing action for loosening and untangling the clothes following centrifuging. This makes it possible for all the clothes to be contacted by the warm air which is circulated by the eccentric movement of the tub within the cabinet upwardly through the ducts 205 and 209 into and out of the tub. This circulating air which is heated by the heaters 207 removes moisture from the clothes and carries this moisture to the water film provided by the condenser tube 213 upon the inner surfaces of the cabinet to condense moisture from this circulating air to dry the clothes. The temperature of the heaters 207 is controlled by the dryer temperature selector 318 which is adjusted by the knob 47. After a sufficient period of time, the cam 312 opens a switch 314 to terminate the heating. The motor 140 continues to operate until the clothes are cooled. The drying period is terminated by the opening of the reversing switch 285 by the cam 283 and by the opening of the switch 245 by the cam 247.

Figures 24, 27:
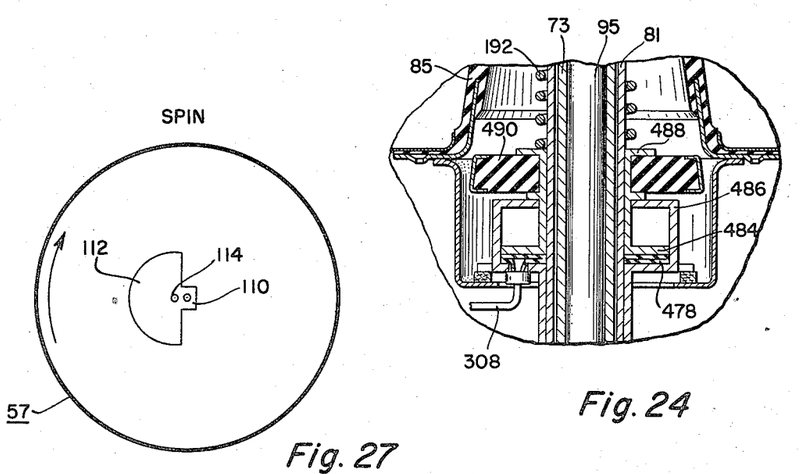
Figure 24 is a fragmentary vertical sectional view showing a modified form of the power operated lateral limiter for the flexible support shown in the released position for washing and spinning.
Figure 27 is a diagrammatic top view of Figure 26.
Figure 25:
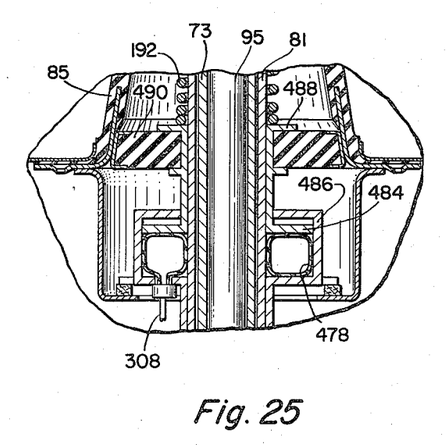
Figure 25 is a fragmentary vertical sectional view similar to Figure 24 showing the parts in engaged position for the drying operation.
Figure 26:
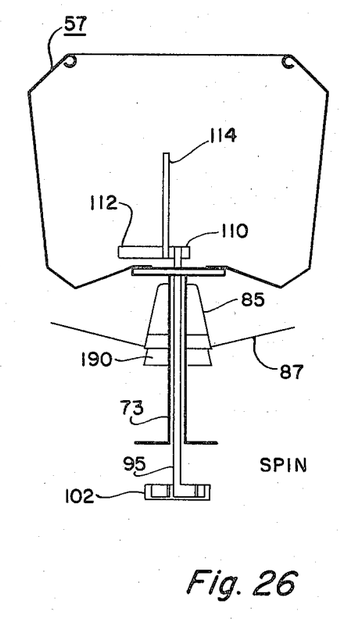
Figure 26 is a diagrammatic vertical sectional view illustrating the relationship of the major parts during the spinning period.

In Figures 24 and 25, a modified plug arrangement is shown in which the plug 490 is connected by the sleeve member 488 to a follower 484 within a cylinder 486. The follower 484 and the cylinder 486 as well as the plug 490 are concentric about the sleeve 81. The sleeve member 488 is slidably mounted upon the sleeve 81 and is urged downwardly by the concentric spring 192. Within the cylinder 486 beneath the follower 484 is a concentric diaphragm 478 which is shaped generally like an automobile inner tube. It is shown collapsed in Figure 24 to remove the plug 490 from its position within the support 85. It is shown in expanded position in Figure 25 to lift the plug 490 into position within the support 85 for the drying period. The interior of the diaphragm 478 connects directly to the conduit 308. Through this conduit 308 a hydraulic fluid is forced into the diaphragm 478 to expand it as shown in Figure 5. To collapse the diaphragm 478 the hydraulic fluid is removed through the conduit 308.

While the form of embodiment of the invention as herein disclosed constitutes a preferred form, it is to be understood that other forms might be adopted, as may come within the scope of the claims which follow.

What is claimed is as follows:

1. A drier including an upright tub provided with a top opening, means for wobbling said tub in one direction within a predetermined speed range, means for simultaneously rotating said tub in the opposite direction at a lower speed than said predetermined speed range, and means for circulating warm air into and out of said tub during said wobbling and simultaneous rotation.

2. A drier including an upright tub provided with a top opening, means for wobbling said tub in one direction within a predetermined speed range, a box shaped cabinet surrounding said tub having a transverse wall beneath said tub, a vertical partition wall extending across one of the vertical corners of the cabinet to form a vertical duct, duct means extending from the upper portion of said partition wall adjacent to the top opening of said tub, said partition wall having an opening adjacent the bottom, and heating means for said vertical duct.

3. A washer-dryer including an upright tub, an upright sleeve member and an upright shaft member concentrically arranged, agitating means for said tub connected to one of said members, the upper end of the other member being connected to said tub, means for operating said one member to operate said agitating means, means for rotating said other member to spin said tub, means for moving the lower end of said one member eccentrically in one direction at a predetermined rate, and means for simultaneously rotating the other member at a different rate.

4. A washer-dryer including an upright tub, an upright sleeve member and an upright shaft member concentrically arranged, agitating means for said tub connected to one of said members, the upper end of the other member being connected to said tub, means for operating said one member to operate said agitating means, means for rotating said other members to spin said tub, means for moving the lower end of said one member eccentrically in one direction at a predetermined rate, and means for simultaneously rotating the other member at a different rate in the opposite direction.

5. A drier including an upright tub, an upright sleeve member and an upright shaft member concentrically arranged, one of said members being provided with an eccentrically located weight adjacent said tub, the other member being connected to said tub, means for rotating the lower end of said one member eccentrically at a predetermined rate to wobble said tub, and means for simultaneously rotating said other member at a different rate.

6. A drier including an upright tub, an upright sleeve member and an upright shaft member concentrically arranged, one of said members being provided with an eccentrically located weight adjacent said tub, the other member being connected to said tub, means for rotating the lower end of said one member eccentrically at a predetermined rate to wobble said tub, and means for simultaneously rotating said other member at a different rate, in the opposite direction.

7. A centrifuging machine including an upright tub, an upright sleeve member and an upright shaft member concentrically arranged, one of said members being provided with an eccentrically located weight adjacent said tub, the other member being connected to said tub, means for rotating said other member and holding said one member from rotation to spin said tub without spinning said weight, and means for rotating the lower end of said one member eccentrically at a predetermined rate to wobble said tub.

8. A centrifuging machine including an upright tub, an upright sleeve member and an upright shaft member concentrically arranged, one of said members being provided with an eccentrically located weight adjacent said tub, the other member being connected to said tub, means for rotating said other member and holding said one member from rotation to spin said tub without spinning said weight, and means for rotating the lower end of said one member eccentrically at a predetermined rate to wobble said tub, and means for simultaneously rotating said other member at a different rate.

9. In combination: an upright tub, driving means beneath the tub, upright shaft means extending from said driving means to said tub, resilient supporting means located adjacent said shaft means between said driving means and said tub for resiliently supporting said shaft means and tub, concentric interengaging abutment means for confining within dimensional limits the lateral movement of said shaft means more than normally permitted by said resilient supporting means, power operated means for rendering effective and ineffective said abutment means, and control means for controlling said power operated means.

10. In combination: an upright tub, driving means beneath the tub, upright shaft means extending from said driving means to said tub, resilient supporting means located adjacent said shaft means between said driving means and said tub for resiliently supporting said shaft means and tub, concentric interengaging abutment means for confining within dimensional limits the lateral movement of said shaft means more than normally permitted by said resilient supporting means, power operated means for rendering effective and ineffective said abutment means, said driving means including controllable means for moving said tub eccentrically, and control means for simultaneously controlling said power operated means and said controllable means.

11. A laundry appliance including an upright centrifuging tub, drive means beneath and connected to the tub, said drive means having a reversible upright drive shaft, said drive shaft being provided with a double eccentric with each eccentric having substantially the same eccentricity, a bearing for said double eccentric, a two way stop arrangement for said double eccentrics for limiting the relative rotation to between positions of maximum and minimum eccentricity, said drive means having means for rotating said upright shaft in the direction to place said eccentrics at minimum eccentricity for centrifuging and for rotating said upright shaft in the opposite direction for maximum eccentricity to wobble the tub.

12. A laundry appliance including an upright centrifuging tub, drive means beneath and connected to the tub, said drive means having a reversible upright drive shaft, a resilient mounting having a part thereof located between said tub and drive means for supporting said tub and drive means, said mounting also including a bearing beneath said drive means, a double eccentric comprising an inner eccentric nested in and rotatably mounted within an outer eccentric, said outer eccentric being rotatably mounted in said bearing, said inner eccentric being connected to said reversible shaft, said eccentrics having substantially the same eccentricity, a first stop arrangement for stopping the relative rotation of said eccentrics at substantially maximum eccentricity for wobbling said tub when said reversible shaft rotates in one direction, and a second stop arrangement for stopping the relative rotation of said eccentrics at substantially minimum eccentricity for spinning said tub when said reversible shaft is rotated in the opposite direction.

13. A drier including an upright tub provided with a top opening, means for wobbling said tub in one direction within a predetermined speed range, a box shaped cabinet surrounding said tub having a transverse wall beneath said tub, a vertical partition wall extending across one of the vertical corners of the cabinet to form a vertical duct, duct means extending from the upper portion of said partition wall adjacent to the top opening of said tub, said partition wall having an opening adjacent the bottom, and means for flowing a thin film of cold water upon the surface of said partition wall.

14. A laundry appliance including an upright tub, means for wobbling said tub in one direction about an upright axis within a predetermined speed range, and means for simultaneously rotating said tub in the opposite direction about its own axis.

15. A laundry appliance including an upright centrifuging tub adapted to contain articles, a drive means beneath and connected to the tub, a laterally and vertically resilient mounting located between and supporting said tub and drive means, said drive means having means for spinning the tub for centrifuging the articles, said drive means also having means for wobbling the tub to fluff the articles, and means for restricting the movement of said mounting during said wobbling and for removing said restriction of said mounting during said spinning.

16. A laundry appliance including an upright centrifuging tub adapted to contain articles, a drive means beneath and connected to the tub, a laterally and vertically resilient mounting located between and supporting said tub and drive means, said drive means having means for agitating the contents of the tub to wash the articles, said drive means also having means for spinning the tub for centrifuging the articles, said drive means also having means for wobbling the tub for fluffing the articles in the tub, and means for restricting the movement of said mounting during said wobbling and removing the restriction of said mounting during said agitation and spinning.

References Cited in the file of this patent

UNITED STATES PATENTS

| | | |
|---|---|---|
| 2,361,767 | Hays | Oct. 31, 1944 |
| 2,372,769 | De Remer | Apr. 3, 1945 |
| 2,381,545 | Kirby | Aug. 7, 1945 |
| 2,624,464 | Morrison | Jan. 6, 1953 |
| 2,715,826 | Kirby | Aug. 23, 1955 |